March 8, 1960 C. M. CAMPBELL, JR 2,928,011

BISTABLE CIRCUITS

Filed Feb. 20, 1958 2 Sheets-Sheet 1

INVENTOR.
CARL M. CAMPBELL, JR.
BY
Gordon R. Sanborn
AGENT

March 8, 1960 C. M. CAMPBELL, JR 2,928,011

BISTABLE CIRCUITS

Filed Feb. 20, 1958 2 Sheets-Sheet 2

INVENTOR.
CARL M. CAMPBELL, JR.
BY Gordon R. Sanborn
AGENT

United States Patent Office 2,928,011

Patented Mar. 8, 1960

2,928,011

BISTABLE CIRCUITS

Carl M. Campbell, Jr., Bryn Mawr, Pa., assignor to Burroughs Corporation, Detroit, Mich., a corporation of Michigan Application February 20, 1958, Serial No. 716,489

16 Claims. (Cl. 307—88.5)

Figure 1:
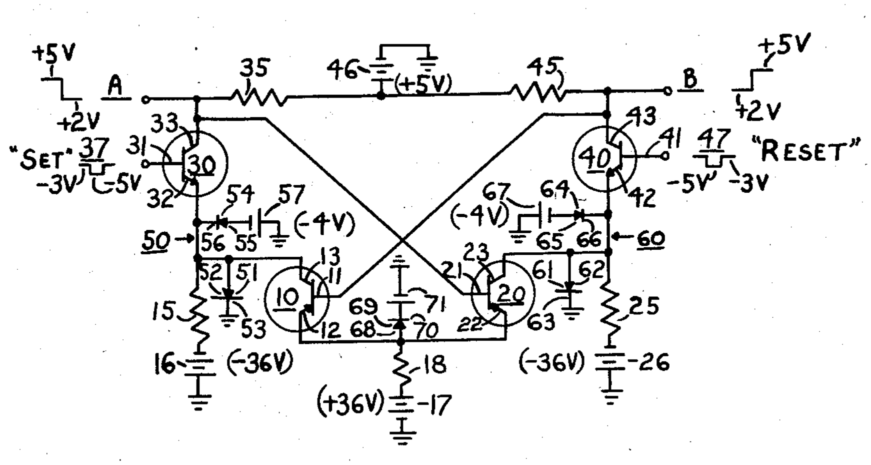

The present invention relates to bistable circuits and more particularly to bistable circuits utilizing transistors and in which internal gating means for placing the circuit in a selected one of the stable conditions may be included.

At the present time bistable or "flip-flop" circuits are widely used as trigger or counter circuits in electronic computers. Prior art bistable circuits utilized in conjunction with counter circuits or logic circuits have generally required separate gating means for controlling the switching of the circuit from one stable condition to the other. Many prior art transistor bistable circuits are operated in a manner such that saturation of one or more transistors occurs, and hence the carrier storage time associated with a saturated transistor may be added to the time required for the circuit to change from one stable condition to the other. In addition, if a bistable circuit, or flip-flop, is to be used as a complementing flip-flop in which the circuit alternates from one stable condition to the other in response to the repeated application of input signals to a common control point, additional steering circuits must usually be used to insure a change in the circuit from one stable state to the other.

Accordingly it is an object of the present invention to provide an improved bistable circuit utilizing semiconductor signal translating devices.

Another object of the present invention is to provide an improved bistable circuit in which the transistors may be operated in their nonsaturated region of operation.

A further object of the present invention is to provide a transistor flip-flop circuit having internal gating means and which can be made to assume a selected one of its stable conditions.

Still another object of the present invention is to provide a simplified complementing flip-flop.

In accordance with the present invention a first impedance element is serially connected with the emitter-collector circuits of a pair of opposite conductivity type transistors in a manner such that conduction of a selected one of the transistors inhibits or prevents conduction of the other transistor, and nonconduction of the selected transistor permits conduction of the other transistor. In a similar manner a second impedance element is serially connected with the emitter-collector circuits of another pair of opposite conductivity type resistors to provide a signal in response to conduction of one transistor which inhibits conduction of the other transistor. The two transistors which inhibit conduction of the other two are of the same conductivity type and may be termed the "inhibiting" transistors. The control electrodes for the two transistors having their conduction either permitted or inhibited in accordance with the states of conduction of the other two transistors are adapted to receive control signals applied to the circuit, the arrangement being such that the application of a signal to a selected control electrode always insures the circuit is in a selected state. A pair of cross-coupling circuits interconnect the emitter-collector circuits of the "inhibited" transistors with the control electrodes of the "inhibiting" transistors in a manner which insures that only two of the four transistors are conducting at one time, one being an "inhibited" transistor and the other an "inhibiting" transistor.

The bistable circuit of the present invention is so constructed that gating functions such as those commonly referred to as "and" and "or" gates may be incorporated as internal components in the bistable circuit through the addition of transistors having emitter-collector circuits directly connected in parallel with those of the four original transistors. Thus the circuit is easily adaptable to use in the logic circuitry of a computing device.

In another embodiment of the present invention a pair of reactive cross-coupling circuit elements such as a pair of capacitors or inductors are connected to the bases of the "inhibited" transistors and coupled with the "inhibiting" transistors in an arrangement which provides a high speed complementing flip-flop.

Figure 2:
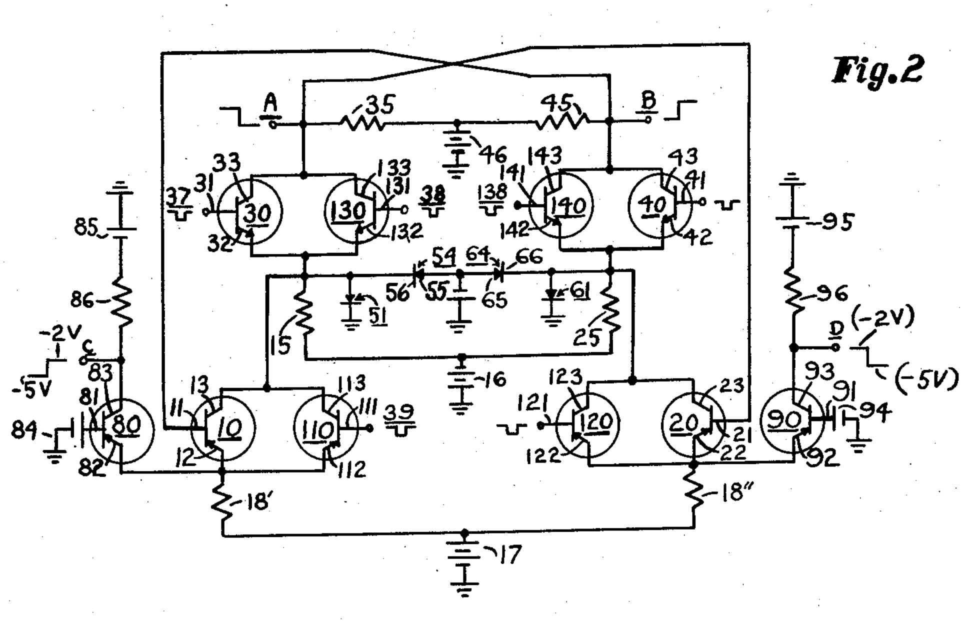
Figure 3:
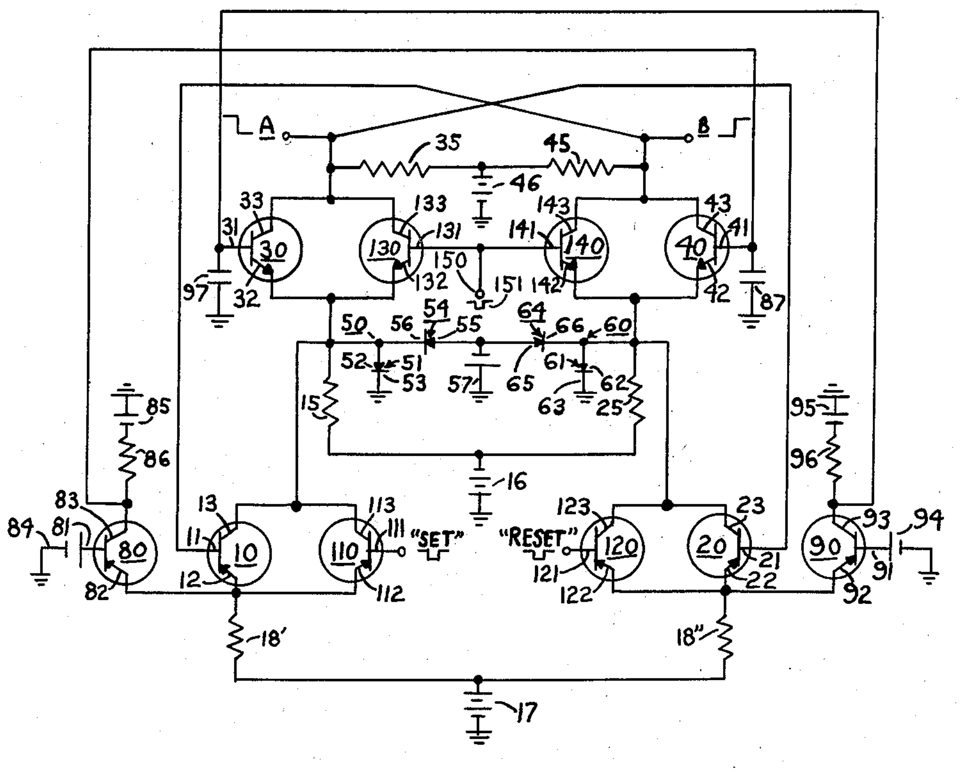

The features considered novel in the present invention are set forth in the appended claims. The invention itself, however, both as to its organization and method of operation as well as additional advantages and objects thereof will be more clearly understood from the following description when read in conjunction with the attached drawings, wherein like components bear the same reference numeral throughout the various figures, and in which, Fig. 1 is a schematic circuit diagram of a preferred embodiment of the bistable circuit of the present invention, Fig. 2 is a schematic circuit diagram of a bistable circuit similar to that illustrated in Fig. 1 but including gating means internal to the bistable circuit, and Fig. 3 is a circuit diagram of a bistable circuit similar to that of Fig. 2 and which includes a pair of cross-coupling reactors illustrated as capacitors in an arrangement in which the repeated application of input signals to one point causes the circuit to alternate from one stable state to the other and hence provide a complementing flip-flop.

Referring now to the drawing and in particular to Fig. 1, first and second transistors shown for purpose of illustration as PNP junction transistors 10 and 20 having base electrodes 11 and 21 respectively, emitter electrodes 12 and 22 respectively, and collector electrodes 13 and 23 respectively, are adapted to serve as "inhibiting" transistors to control the states of conduction of another pair of junction transistors of opposite conductivity type illustrated as third and fourth NPN junction transistors 30 and 40 having base electrodes 31 and 41, emitter electrodes 32 and 42, and collector electrodes 33 and 43. The base electrodes 31 and 41 of the NPN transistors 30 and 40 are normaly maintained at a potential which is negative with respect to a point of fixed reference potential which will be referred to hereinafter as ground, and are adapted to receive input signals to the circuit which will be referred to as "set" and "reset" signals.

A first impedance element illustrated as a resistor 15 has one end connected in common to the emitter 32 of the third transistor and the collector 13 of the first transistor, and another end connected to a point of direct current (D.C.) potential which is negative with respect to ground provided by a first battery 16 having its positive terminal grounded. In a similar manner a second impedance element such as the resistor 25 interconnects the emitter electrode 42 of the fourth transistor 40 and the collector electrode 23 of the second transistor 20 with the negative terminal of a second source of D.C. potential illustrated as a second battery 26 having its positive terminal grounded. The emitter electrodes 12 and 22 of the first and second transistors are directly interconnected and also connected to the positive terminal of a third battery 17 through a dropping resistor 18, the negative terminal of the battery 17 being grounded.

A fourth source of D.C. potential illustrated as a battery 46 having its negative terminal grounded provides the collector potential for the NPN transistors by having its positive terminal coupled with the collector electrode 33 by a load element such as a resistor 35 and to the collector electrode 43 by another load element such as a resistor 45. The base electrode 11 of the first transistor 10 is coupled with the collector electrode 43 of the fourth transistor and is therefore sensitive to the voltage existing across the load resistor 45 associated with current flow through the fourth transistor. In like manner the base 21 of the second transistor is adapted to be sensitive to voltage changes across the load resistor 35 associated with current flow through the third transistor 30 by being coupled with the collector electrode 33, and as illustrated in the drawing is directly connected to the collector 33.

To prevent saturation of the transistors in the circuit of Fig. 1 the resistors and sources of potential may be so selected that substantially constant current sources are provided. Thus the resistors 15 and 25 together with the voltage sources 16 and 26 may be advantageously selected in a manner such that a large resistance is connected to a relatively large potential supply in each case to provide a constant current source. To further insure nonsaturation of the transistors and to provide a fixed voltage about which the control signals for the circuit may be varied to change the circuit from one stable condition to the other, a pair of voltage limiting networks 50 and 60 is included. The network 50 includes a first unidirectional current conducting device such as a diode 51 having an anode 52 connected to the collector 13 and emitter 32 and a cathode 53 grounded, and a second diode 54 having a cathode 56 connected to the emitter 32 and collector 13 and an anode 55 connected to the negative terminal of a battery 57, the positive terminal of which is grounded. Thus the potential of the junction of the emitter 32 and collector 13 is limited between ground potential and the negative potential of the battery 57. Thus diode 51 insures nonsaturation of transistor 10 and diode 54 with battery 57 provides a signal level about which the input signal level is varied for circuit switching. In a similar manner the second voltage limiting network 60 includes third and fourth diodes 61 and 64 having anodes 62 and 65 and cathodes 63 and 66. The anode 62 and the cathode 66 are each connected to the emitter 42 and to collector 23, the cathode 63 is grounded, and the anode 65 is connected to the negative terminal of a battery 67 having its positive terminal grounded. Thus the potential of the emitter 42 and the collector 23 is limited between ground and the potential of the battery 67. Nonsaturation of transistor 20 is therefore insured and a fixed potential is established about which the input signal is varied for controlling the circuit. A fifth diode 68 having an anode 69 connected to the emitters 12 and 22 and a cathode 70 connected to the positive terminal of a battery 71, the negative terminal of which is grounded, limits the positive potential of the emitters 12 and 22 to assist the switching of current flow from one of transistors 10 or 20 to the other in a manner to be described later.

The quiescent potential normally maintained upon the base electrode 31 of the transistor 30 in the absence of input control signals thereto is negative with respect to the emitter 32 when the first transistor 10 is conductive, since conduction of transistor 10 tends to make the emitter 32 rise to ground where it is clamped by diode 51.

The quiescent potential upon the base 31 tends to be positive with respect to the potential of the emitter 32 when the first transistor is nonconductive, since nonconduction of transistor 10 allows the potential of the emitter 32 to drop to the negative potential of the battery 57 as a result of diode 54 being rendered conductive. Thus when transistor 10 is nonconductive transistor 30 tends to conduct. Since the most negative potential to which the emitter 32 can drop is equal to that of the battery 57, it is seen that changing the potential of the base 31 when the transistor 30 is conducting to a potential which is more negative than that of the battery 57 will render transistor 30 nonconductive. In a similar manner the quiescent potential of the base 41 is negative with respect to the potential of the emitter 42 during conduction of the second transistor 20, and is positive with respect to the negative potential of the battery 67 to which the emitter 42 would normally be clamped when the second transistor is nonconductive. As set forth in conjunction with transistor 30, when the potential of the base 41 is made more negative than that of the battery 67 nonconduction of transistor 40 results. For purpose of illustration the signals 37 and 47 applied to the bases 31 and 41 are shown as varying between −3 volts and −5 volts.

Assuming the first transistor 10 to be nonconductive the base-emitter junction of the third transistor 30 is forwardly biased and emitter-collector current flows through resistors 35 and 15. The potential drop across resistor 35 is applied to the base 21 of the second transistor and is of sufficient amplitude to forwardly bias the emitter-base junction of the second transistor, thereby rendering it conductive. Hence emitter-collector current for the second transistor flows through the resistors 18 and 25, such current flow producing a voltage across resistor 25 which is of sufficient magnitude and polarity to backwardly bias the base-emitter junction of the fourth transistor, thereby insuring nonconduction of the fourth transistor. Such current flow also lowers the potential of the emitters 12 and 22 to a value slightly above that of the base of transistor 20 which is provided by the voltage drop across resistor 35. Since conduction of the fourth transistor 40 is inhibited or prevented by conduction of the second transistor, the base 11 of the first transistor is maintained at the positive potential provided by the fourth battery 46. This positive potential in conjunction with the lowered potential upon the emitter 12 of the first transistor associated with the current flow through the load resistor 18 serves to backwardly bias the emitter-base junction of the first transistor. Hence the first transistor remains nonconductive, permitting the third transistor to conduct.

When a negative going "set" input signal 37 is applied to the base electrode 31 of the third transistor when the circuit is in the above set forth condition with the second and third transistors conducive and the first and fourth transistors nonconductive, the base-emitter junction of the third transistor will be backwardly biased and thus the third transistor rendered nonconductive. This follows since as the base potential is lowered the emitter tends to follow but is limited in its negative swing by the diode 54 and battery 57. Hence when the base gets more negative than the battery 57 the transistor becomes nonconductive. In response to nonconduction of the third transistor the potential of the collector 33 will rise toward the positive potential of the battery 46, and hence the potential of the base 21 which is connected to the collector 33 will also rise toward the positive potential of the battery 46. As the base potential rises the emitter 22 follows but is clamped by diode 68 to a potential negative with respect to that of battery 46. This backwardly biases the emitter-base junction of the second transistor 20 and hence renders the second transistor nonconductive. When the second transistor 20 is rendered nonconductive current flow through the dropping resistor 25 decreases and the potential of the collector 23 and emitter 42 begins to fall toward the negative potential of the second battery 26, being limited by the diode 64 and battery 67. As soon as the potential of the emitter 42 becomes negative with respect to the quiescent potential maintained upon the base 41, the fourth transisor 40 becomes conductive and permits current flow through the load resistor 45. Such current flow through the resistor 45 provides a potential upon the base 11 which is negative with respect to the potential to which the emitter 12 is clamped by diode 68. Thus the first transistor 10 is rendered conductive and provides current flow through resistor 15, thereby inhibiting conduction of the third transistor 30 by backwardly biasing its emitter-base junction. Hence the circuit is swtiched from the stable condition wherein only the second and third transistors were conducting to the stable condition wherein only the first and fourth transistors are conducting. From the symmetry of the circuit it is seen that the application of a negative going "reset" signal 47 to the base 41 of the fourth transistor 40 will return the circuit to the original stable condition in which only the second and third transistors are conductive. Thus a selected one of the stable states is obtained through the application of a control signal to the proper base electrode.

A plurality of voltage sources has been illustrated in Fig. 1 to facilitate the explanation of the circuit. It is to be expressly understood however that such plurality is not required and is shown only for purpose of illustration, it being obvious to one skilled in the art that the various potentials could be provided in a number of ways which are well known in the art.

Output signals from the circuit of Fig. 1 may be derived from various points in the circuit, and for purpose of illustration first and second signal output terminals A and B are respectively connected to the collector electrodes 33 and 43 of the third and fourth transistors. The signal provided at the signal output terminal A varies between the positive potential of the battery 46 and a less positive potential, the amplitude of which may be controlled by the impedance of the load resistor 35. In like manner the potential of the output signal provided at the signal output terminal B varies from a potential corresponding to the voltage drop across the load resistor 45 during conduction of the fourth transistor to the positive potential provided by the battery 46 when transistor 40 is nonconductive. With the circuit parameters illustrated in Fig. 1 the output signals vary between +5 v. and a potential which is more negative than +4 v. but still above ground. It is seen that when the output signal at A is most positive the signal at B is least positive.

In Fig. 2 an embodiment of the present invention is illustrated which is similar to that shown in Fig. 1, but includes additional transistors which are incorporated to provide additional output signals and perform gating functions for the circuit in a manner such that the gating arrangements are internal to the bistable circuit. Thus a fifth PNP junction transistor 110 having a base electrode 111, an emitter electrode 112 and a collector electrode 113 is connected in parallel with the transistor 10 through direct interconnection of the collector electrodes 13 and 113, and of the emitter electrodes 12 and 112. The base electrode 111 is normally maintained positive with respect to the emitter 112 and is adapted to receive negative going input signals which are of sufficient amplitude to change the transistor 110 from its nonconducting condition to conduction. In like manner a sixth PNP transistor 120 having a base electrode 121 adapted to receive input signals, an emitter electrode 122 connected to the emitter 22, and a collector electrode 123 connected to the collector 23 is adapted to be conductive only in response to negative going signals applied to the base electrode 121.

A seventh NPN transistor 130 having a base electrode 131 adapted to receive negative going input signals, an emitter electrode 132 connected to the emitter 32, and a collector electrode 133 connected to the collector 33 tends to be conductive when transistor 10 or 110 are conductive in a manner similar to that of transistor 30, and is adapted to be rendered nonconductive in response to the application of a negative going control signal 38 to the base electrode 131. In like manner an eighth NPN transistor 140 having a base electrode 141 adapted to receive negative going control signals, an emitter electrode 142 connected to the emitter 42, and a collector 143 connected to the collector 43 tends to be conductive when transistor 20 or 120 is conductive in a manner similar to that of transistor 40, and is adapted to be rendered nonconductive in response to negative going control signals 138 applied to the base 141.

If additional signals, such as for example positive going signals, are desired from the circuit the voltage clamping diode 68 of Fig. 1 may be replaced by the PNP transistors 80 and 90 having base electrodes 81 and 91, emitter electrodes 82 and 92, and collector electrodes 83 and 93, respectively. The emitter 82 is connected to the emitter 12 of the first transistor, the base 81 is maintained at a potential which is positive with respect to ground by being connected to the positive terminal of a battery 84, the negative terminal of which is grounded, and the collector 83 is connected to the negative terminal of a battery 85 through a load element illustrated as a resistor 86. The positive terminal of the battery 85 is grounded and therefore the signals provided at a signal output terminal C which is connected to the collector 83 will vary between a negative potential corresponding to the potential provided by the battery 85 during nonconduction of transistor 80 and a more positive potential corresponding to the voltage drop across the resistor 86 associated with conduction of the transistor 80.

In a similar manner the emitter 92 of the transistor 90 is connected directly to the emitter 22, the base 91 is maintained at a potential which is positive with respect to ground by means of a battery 94 having its negative terminal grounded, and the collector 93 is coupled through a load resistor 96 to a negative potential provided by a battery 95. The positive terminal of the battery 95 is grounded and therefore output signals provided at a signal output terminal D vary in a manner which corresponds to those provided at signal output terminal C but which are negative when the signal at C is positive. A further change in the circuit of Fig. 2 is to be noted in that the resistor 18 of Fig. 1 is replaced by two emitter resistors 18' and 18'' which respectively interconnect the emitters 12 and 22 with the positive terminal of the battery 17. The potentials of the emitters 12 and 22 are limited in the positive potentials which they may assume as a consequence of the bases 81 and 91 of transistors 80 and 90 being maintained at fixed potentials, said potentials preferably being more positive than ground but less positive than battery 46. If output signals C and D are not desired transistors 80 and 90 may be replaced by diodes.

The operation of the circuit of Fig. 2 is similar to that of Fig. 1 in that when the transistor 30 and/or 130 is conducting a relatively negative potential is maintained upon the base of the inhibiting transistor 20 to render it conductive and thereby provide current flow through the dropping resistor 25 which prevents conduction of the transistors 40 and 140. With the transistors 40 and 140 nonconductive the base of the transistor 10 is adapted to be more positive than the base of the transistor 80 and therefore the current provided by the battery 17 through the resistor 18' flows through the transistor 80 to provide a positive going output signal at the terminal C. The potential provided upon the base 21 during conduction of the transistors 30 and 130 is selected to be more negative than the potential upon the base 91, and hence the transistor 90 remains non-conductive, maintaining the output terminal D at a potential equal to the potential of the battery 95.

To switch the circuit to its other stable condition negative going control signals 37 and 38 must be simultaneously applied to the base electrodes 31 and 131 to render the transistors 30 and 130 nonconductive, or a negative going control signal 39 must be applied to the base 111 of the transistor 110 to render the transistor 110 conductive and thereby provide an inhibiting current flow through the dropping resistor 15, such current flow making transistors 30 and 130 nonconductive. Hence an AND and an OR gate are provided which are internal to the circuit. When the transistors 30 and 130 are thusly rendered nonconductive the potential upon the base of the inhibiting transistor 20 rises and backwardly biases the base-emitter junction of the transistor 20, thereby permitting transistor 90 to conduct and also remove the inhibiting signal upon the emitters of the transistors 40 and 140. Thus the transistors 40 and 140 become conductive causing the transistor 10 to conduct in response to the negative going signal provided by the current flow through the load resistor 45, with conduction of transistor 10 making transistor 80 nonconductive. From the symmetry of the circuit it is seen that the circuit will be placed in its original condition with the transistors 30, 130, and 20 conducting only if negative going control signals are applied to the base electrodes 40 and 140 or the base electrode of the transistor 120.

In Fig. 3 a circuit arrangement is illustrated which is similar to that shown in Fig. 2 but includes a pair of reactive crosscoupling devices such as capacitors or inductors which may be included to change the circuit to a complementing flip-flop wherein the repeated application of control signals to a single input point repeatedly changes the circuit from one stable condition to the other. Thus for purpose of illustration a first crosscoupling capacitor 87 is connected between the base electrode 41 of the transistor 40 and signal ground, with the base electrode 41 being connected directly to the collector 83 of the transistor 80. In like manner a second crosscoupling capacitor 97 is connected between the base electrode 31 of the transistor 30 and signal ground, with the base 31 being connected directly to the collector 93 of the transistor 90. In the embodiment of the present invention illustrated in Fig. 3 the base electrodes 131 and 141 are directly interconnected to provide a common signal input terminal 150 to which there may be applied negative going control signals 151.

The potential normally maintained upon the signal input terminal 150 and hence upon the base electrodes 131 and 141 is such that the transistors 130 and 140 tend to be conductive. Assuming the transistor 130 to be conductive, the voltage drop across the load resistor 35 will forwardly bias the emitter-base junction of the second transistor 20 and thereby cause an inhibiting current to flow through the dropping resistor 25, insuring nonconduction of the transistors 40 and 140. As set forth in conjunction with Fig. 2, the base 91 is maintained at a potential such that the emitter-base junction of the transistor 90 is backwardly biased in response to current flow through the load resistor 18″ caused by conduction of the transistor 20. Thus the collector 93 is at the potential of the battery 95 and hence the cross-coupling capacitor 97 is charged to the negative potential of the battery 95. This potential is selected to be of sufficient amplitude to maintain the third transistor 30 nonconductive.

Since the transistors 40 and 140 are inhibited or prevented from conducting, the base 11 of the transistor 10 is at the potential of the battery 46, thereby maintaining the transistor 10 nonconductive. As a result the transistor 80 is conductive and the potential of its collector 83 is more positive than the negative potential provided by the battery 85, which is preferably equal to the negative potential of the battery 95. Thus the crosscoupling capacitor 87 charges to the potential of the collector 83, said potential being selected to tend to cause conduction of the transistor 40 in the absence of the inhibiting signal associated with current flow through the dropping resistor 25 when transistor 20 is conducting. Thus it is seen that in one stable condition the transistors 130, 80, and 20 are conducting.

When a negative going control signal 151 is applied to the signal input terminal 150 the transistor 130 is rendered nonconductive and also the emitter-base junction of the transistor 140 becomes more backwardly biased. As a result of nonconduction of the transistor 130 current flow ceases through the load resistor 35 and the transistor 20 becomes nonconductive. Hence the inhibiting signal upon the emitters 141 and 41 associated with current flow through the dropping resistor 25 is removed, permitting conduction of the transistor 40 as a result of the base potential provided by the capacitor 87 which was previously charged to the potential of the collector 83 during conduction of the transistor 80. When the transistor 20 becomes nonconductive the transistor 90 becomes conductive due to the rise in emiter potential, and hence the potential of the collector 93 rises, thereby changing the charge upon the capacitor 97 to a more positive value which tends to render the transistor 30 conductive. Conduction of the transistor 30 is prevented, however, since conduction of the transistor 40 lowers the potential of the base electrode 11 below the potential of the base electrode 81, and hence current flows through the transistor 10 and resistor 15 to provide an inhibiting signal upon the emitters 32 and 132.

The size of the capacitor 87 is so selected that the time required for the capacitor to discharge through the resistor 86 is longer than the duration of the input pulse 151. Therefore the transistor 40 remains conductive until the input signal 151 has ended. Upon termination of the input pulse 151 the transistor 140 becomes conductive as a result of the quiescent potential upon the base 141 and serves to maintain the circuit in its other stable condition after the capacitor 87 is discharged, such discharge permitting the transistor 40 to become nonconductive. From the symmetry of the circuit it is seen that the next negative going control signal applied to the signal input terminal 150 will render the transistor 140 nonconductive and return the circuit to the original stable condition in a manner similar to that just described. Thus the circuit will change from one stable condition to the other in response to successive input signals to the control point 150.

The circuit of Fig. 3 will of course operate in a similar manner if the capacitors are eliminated, first and second inductors connected respectively from base 31 to collector 93 and from base 41 to collector 83, and suitable resistance and bias means connected to the bases 31 and 41. In some applications such modification of the circuit proves advantageous.

The transistors 110 and 120 are included in the circuit of Fig. 3 only if a "set" or "reset" capability is desired. Thus if a negative going control signal is applied to the base electrode of the normally nonconductive transistor 110 when transistor 130 is conductive or to transistor 120 when transistor 140 is conductive, the circuit will be placed in a selected one of its stable conditions in a manner corresponding to that set forth in conjunction with the operation of the circuit of Fig. 2.

There has thus been disclosed bistable circuits utilizing transistors to provide either complementing or noncomplementing flip-flops, and which may incorporate internal gating means.

What is claimed is:

1. A bistable circuit comprising in combination: first and second transistors of one conductivity type and third and fourth transistors of another conductivity type, each of said transistors having a base electrode and an emitter-collector circuit; a first impedance element connected serially with the emitter-collector circuits of said first and third transistors adapted to provide a first signal in response to conduction of said first transistor; means rendering said third transistor nonconductive during the presence of said signal and conductive in the absence of said signal; a second impedance element connected serially with the emitter-collector circuits of said second and fourth transistors adapted to provide a second signal in response to conduction of said second transistor; means rendering said fourth transistor nonconductive during the presence of said second signal and conductive in the absence of said second signal; means connecting the base of said first transistor to the emitter-collector circuit of said fourth transistor adapted to maintain said first transistor conductive in response to conduction of said fourth transistor and nonconductive in response to nonconduction of said fourth transistor; and means connecting the base of said second transistor to the emitter-collector circuit of said third transistor adapted to maintain said second transistor conductive in response to conduction of said third transistor and nonconductive in response to nonconduction of said third transistor.

2. A bistable circuit in accordance with claim 1 and including fifth and sixth transistors having emitter-collector circuits respectively connected in parallel with the emitter-collector circuits of said third and fourth transistors, and seventh and eighth transistors having emitter-collector circuits respectively connected in parallel with the emitter-collector circuits of said first and second transistors.

3. A bistable circuit comprising in combination: first and second junction transistors of one conductivity type and third and fourth junction transistors of another conductivity type; each of said transistors having a base, an emitter, and a collector; a first impedance element having one terminal connected to the collector of said third transistor and to the emitter of said first transistor; a second impedance element having one terminal connected to the collector of said fourth transistor and to the emitter of said second transistor; a third impedance element having one terminal connected to the base of said third transistor and to the collector of said second transistor; a fourth impedance element having one terminal connected to the base of said fourth transistor and to the collector of said first transistor; means maintaining said first transistor nonconductive in response to current flow through said first impedance element associated with conduction of said third transistor; means maintaining said second transistor nonconductive in response to current flow through said second impedance element associated with conduction of said fourth transistor; means maintaining said third transistor conductive in response to conduction of said second transistor, means maintaining said fourth transistor conductive in response to conduction of said first transistor; and signal input means connected to the bases of said first and second transistors.

4. A bistable circuit in accordance with claim 3 and including voltage clamping means connected to the emitters of said first and second transistors.

5. A bistable circuit comprising in combination: first and second junction transistors of the same conductivity type each having a base, an emitter, and a collector; third and fourth junction transistors of conductivity type opposite to that of said first transistor and each having a control electrode and an emitter-collector circuit; a first resistive impedance element having one terminal connected to the emitter of said first transistor and to the emitter-collector circuit of said third transistor adapted to provide a first signal in response to conduction of said third transistor; means rendering said first transistor nonconductive throughout the occurrence of said first signal and conductive in the absence of said first signal; a second resistive impedance element having one terminal connected to the emitter of said second transistor and to the emitter-collector circuit of said fourth transistor adapted to provide a second signal in response to conduction of said fourth transistor; means rendering said second transistor nonconductive throughout the occurrence of said second signal and conductive in the absence of said second signal; means rendering said third transistor conductive only during conduction of said second transistor; means rendering said fourth transistor conductive only during conduction of said first transistor; and signal input means connected to the bases of said first and second transistors.

6. A bistable circuit comprising in combination: first and second junction transistors of one conductivity type and third and fourth junction transistors of another conductivity type, each of said transistors having a base, an emitter, and a collector; means including a first resistor having one terminal connected to the emitter of said first transistor and to the collector of said third transistor for inhibiting conduction of said first transistor in response to conduction of said third transistor; means including a second resistor having one terminal connected to the emitter of said second transistor and to the collector of said fourth transistor for inhibiting conduction of said second transistor in response to conduction of said fourth transistor; means including first and second cross-coupling circuits respectively interconnecting the base of said fourth transistor with the collector of said first transistor and the base of said third transistor with the collector of said second transistor for maintaining said third transistor conductive only during conduction of said second transistor and said fourth transistor conductive only during conduction of said first transistor; and signal input means connected to the bases of said first and second transistors.

7. In a bistable circuit which utilizes transistors operated in their nonsaturated region of operation the combination which comprises: first and second junction transistors of the same conductivity type each having a control electrode and a load circuit, the load circuit of said first transistor being adapted to provide a first signal during conduction of said first transistor and a second signal during nonconduction of said first transistor, the load circuit of said second transistor being adapted to provide a third signal during conduction of said second transistor and to provide a fourth signal during nonconduction of said second transistor; third and fourth junction transistors of conductivity type different from that of said first transistor; said third transistor having a base electrode adapted to receive control signals, a collector electrode coupled with the control electrode of said second transistor adapted to maintain said second transistor conductive only during conduction of said third transistor, and an emitter electrode connected to the load circuit of said first transistor adapted to inhibit conduction of said third transistor in response to said first signal and to permit conduction of said third transistor in response to said second signal; said fourth transistor having a base electrode adapted to receive control signals, a collector electrode connected to the control electrode of said first transistor adapted to maintain said first transistor conductive only during conduction of said fourth transistor, and an emitter electrode connected to the load circuit of said second transistor adapted to inhibit conduction of said fourth transistor in response to said third signal and to permit conduction of said fourth transistor in response to said fourth signal.

8. A bistable circuit comprising in combination: first and second junction transistors of one conductivity type and third and fourth junction transistors of another conductivity type, each of said transistors having a base, an emitter, and a collector; resistive impedance means connected to the emitters of said first and second transistors and to a source of potential; a first resistor connected to the emitter of said third transistor, to the collector of said first transistor, and to a source of potential; a second resistor connected to the emitter of said fourth transistor, to the collector of said second transistor, and to a source of potential; a third resistor connected to the collector of said third transistor, to the base of said second transistor, and to a source of potential; a fourth resistor connected to the collector of said fourth transistor, to the base of said first transistor, and to a source of potential; voltage limiting means connected to the emitters of said third and fourth transistors; and signal input means coupled with said third and fourth transistors.

9. A bistable circuit in accordance with claim 8 wherein said first resistor and the source of potential to which it is connected, and said second resistor and the source of potential to which it is connected, provide substantially constant current sources.

10. A bistable circuit in accordance with claim 8 wherein said resistive impedance means includes a fifth resistor connected to the emitter of said first transistor and a sixth resistor connected to the emitter of said second transistor, said circuit further including: means directly interconnecting the bases of said third and fourth transistor; a fifth transistor of the same conductivity type as said first transistor and having an emitter connected to the emitter of said first transistor, a base maintained at a substantially constant potential, and a collector; a sixth transistor of the same conductivity type as said second transistor and having an emitter connected to the emitter of said second transistor, a base maintained at a substantially constant potential, and a collector; a seventh transistor of the same conductivity type as said third transistor and having a collector connected to the collector of said third transistor, an emitter connected to the emitter of said third transistor, and a base; an eighth transistor of the same conductivity type as said fourth transistor and having a collector connected to the collector of said fourth transistor, an emitter connected to the emitter of said fourth transistor, and a base; a first reactive impedance element connected to the collector of said fifth transistor and to the base of said eighth transistor; and a second reactive impedance element connected to the collector of said sixth transistor and to the base of said seventh transistor.

11. A bistable circuit according to claim 10 wherein said reactive impedance elements are capacitors.

12. A bistable circuit comprising in combination: first and second PNP junction transistors each having a base, an emitter, and a collector; impedance means connected to each of said emitters; a first resistor connected to the collector of said first transistor; a second resistor connected to the collector of said second transistor; a first NPN junction transistor having an emitter connected to the collector of said first PNP transistor, a collector connected to the base of said second PNP transistor, and a base adapted to receive control signals; a second NPN junction transistor having an emitter connected to the collector of said second PNP transistor, a collector connected to the base of said first PNP transistor, and a base adapted to receive control signals; first voltage limiting means connected to the emitters of said PNP transistors, and second voltage limiting means connected to the emitters of said NPN transistors.

13. A bistable circuit in accordance with claim 12 and including: a third NPN transistor having a collector connected to the collector of said first NPN transistor, an emitter connected to the emitter of said first NPN transistor, and a base; and a fourth NPN transistor having a collector connected to the collector of said second NPN transistor, an emitter connected to the emitter of said second NPN transistor, and a base.

14. A bistable circuit in accordance with claim 13 wherein said first voltage limiting means includes a third PNP transistor having an emitter connected to the emitter of said first PNP transistor, a base maintained at a constant potential, and a collector; and a fourth PNP transistor having an emitter connected to the emitter of said second PNP transistor, a base maintained at a constant potential, and a collector.

15. A bistable circuit in accordance with claim 13 and including: means directly interconnecting the bases of said first and second NPN transistors to provide a common signal input circuit for said first and second NPN transistors; a first reactive impedance element connected to the base of said third NPN transistor and to the collector of said fourth PNP transistor; and a second reactive impedance element connected to the base of said fourth NPN transistor and to the collector of said third PNP transistor.

16. A complementing bistable circuit comprising: first, second, third, and fourth junction transistors of one conductivity type each having a base, a collector, and an emitter; fifth, sixth, seventh, and eighth junction transistors of another conductivity type each having a base, an emitter, and a collector; means including a first impedance element connected to the emitters of said first and second transistors and to the collector of said fifth transistor for providing a signal to prevent conduction of said first and second transistors during conduction of said fifth transistor; means including a second impedance element connected to the emitters of said third and fourth transistors and to the collector of said sixth transistor for providing a signal to prevent conduction of said third and fourth transistors during conduction of said sixth transistor; means connected to the collectors of said first and second transistors and to the base of said sixth transistor maintaining said sixth transistor conductive only when one of said first or second transistors is conductive; means connected to the collectors of said third and fourth transistors and to the base of said fifth transistor for maintaining said fifth transistor conductive only when one of said third or fourth transistors is conductive; a third impedance element connected to the emitters of said fifth and seventh transistors; a fourth impedance element connected to the collector of said seventh transistor and to the base of said fourth transistor; bias means maintaining the base of said seventh transistor at a substantially constant potential; a fifth impedance element connected to the emitters of said sixth and eighth transistors; a sixth impedance element connected to the collector of said eighth transistor and to the base of said first transistor; bias means maintaining the base of said eighth transistor at a substantially constant potential; a first capacitor connected to the base of said first transistor and to a point of reference potential; a second capacitor connected to the base of said fourth transistor and to a point of reference potential; and voltage limiting means connected to the emitters of said first four transistors.

No references cited.